(12) United States Patent
Liao

(10) Patent No.: US 9,031,593 B2
(45) Date of Patent: May 12, 2015

(54) BASE STATION SYNCHRONISATION

(75) Inventor: Jingyi Liao, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 346 days.

(21) Appl. No.: 13/516,835

(22) PCT Filed: Dec. 23, 2009

(86) PCT No.: PCT/CN2009/001534
§ 371 (c)(1),
(2), (4) Date: Jun. 19, 2012

(87) PCT Pub. No.: WO2011/075867
PCT Pub. Date: Jun. 30, 2011

(65) Prior Publication Data
US 2012/0258752 A1      Oct. 11, 2012

(51) Int. Cl.
*H04B 7/00*       (2006.01)
*H04W 56/00*   (2009.01)
*H04B 7/26*       (2006.01)

(52) U.S. Cl.
CPC .............. *H04W 56/00* (2013.01); *H04B 7/2684* (2013.01); *H04W 56/001* (2013.01); *H04W 56/0055* (2013.01)

(58) Field of Classification Search
CPC ... H04B 7/2684; H04B 7/2681; H04B 7/2678
USPC ......... 455/502, 500, 517, 445, 509, 507, 511, 455/513, 515, 450, 525, 422.1, 403, 550.1, 455/561, 562.1, 432.1–432.3, 67.11, 455/423–425; 370/310, 350, 345, 328, 329, 370/338, 343, 503, 507, 508
See application file for complete search history.

(56) References Cited

U.S. PATENT DOCUMENTS 6,097,709 A *   8/2000  Kuwabara ..................... 370/331
6,208,871 B1 * 3/2001  Hall et al. ..................... 455/517
2009/0245228 A1  10/2009  Osterling

FOREIGN PATENT DOCUMENTS

CN           101448314 A      6/2009
WO    WO 2008/133567 A1    6/2008

* cited by examiner

*Primary Examiner* — Keith Ferguson

(57) ABSTRACT

A method for determining data enabling a plurality of secondary base stations to time their transmissions to a mobile station within a timing range. The mobile station obtains time delays of transmissions from each of the secondary base stations in reaching the mobile station, and determines time delay differences between the time delays and a reference time delay associated with a primary base station. The mobile station transmits the time delay differences to the plurality of secondary base stations. Each secondary base station receives the difference between its own transmission time delay and the reference time delay, compares the difference with a time range, and corrects the timing of its transmissions if the difference is outside of the time range.

16 Claims, 3 Drawing Sheets

BASE STATION SYNCHRONISATION

TECHNICAL FIELD

The invention relates to synchronisation of base stations in a wireless wide area network. More particularly, the invention relates to a method, a mobile station and a computer program product for determining data allowing a set of base stations to time their transmissions to a mobile station within a timing range. The invention also relates to a method, device and computer program product for controlling the timing of the transmissions to a mobile station (10) from a base station.

BACKGROUND

Long Term Evolution (LTE) is the fourth generation mobile phone system being developed through the 3rd Generation Partnership Project (3GPP). Coordinated multi-point (CoMP) and Relay are advanced techniques introduced in 3GPP LTE in order to improve system performance, especially at cell edges. Multipoint communication here involves synchronized communication with multiple nodes in a network.

According to Qualcomm, 3GPP R1-084400, "Coordinated Multi-Point downlink transmission in LTE-Advanced", Nov. 10-15, 2008, 3GPP TSG-RAN WG1 #55, the CoMP transmission techniques can be broadly categorized as joint processing, cooperative Beamforming, and cooperative silencing.

However, the applications of these CoMP techniques have more or less a requirement for coordinated multi-point synchronization. The coordinated multi-point synchronization have shown to be advantageous for coordinated multi-point processing, like macro-diversity reception see for instance Texas Instruments, 3GPP R1-093168, "Timing Advanced commands in support of UL COMP operation", Aug. 24-28, 2009, 3GPP TSG-RAN WG1#58, Shenzhen, China and Texas Instruments, 3GPP R1-091293, "Enabling Coordinated Multi-point Reception", Mar. 23-27, 2009, 3GPP TSG RAN WG1 #56bis, Seoul, Korea.

The requirements of the coordinated multi-point synchronization in a multi-point communication system can be coarsely classed to a loose synchronization and a tight synchronization. Loose synchronization can be seen as, User Equipment (UEs), normally cellular phones, communicating with a node having to adjust their transmission timing so that their signals arrive approximately simultaneously to the receiver, i.e. within a CP (cycle prefix) tolerance.

Loose synchronization can contribute to coordinated multi-point processing e.g. a macro combination processing on signals from the multiple nodes. At least the delay diversity gain can be obtained even if the signals from the multiple nodes are not strictly synchronized. However, if a tight synchronization is used, the signals from/to multiple cooperative nodes should arrive at a corresponding entity with which these nodes communicate within a small timing window, which may be the case in for instance cooperative beamforming. The tolerated receiving timing error of such signals for a beam forming system is much lower than a sampling duration (Ts) and can for example be a fraction of the sampling duration (Ts), e.g. $\frac{1}{32}$ Ts, $\frac{1}{4}$ Ts. A tight synchronization can further contribute to the obtaining of the coordinated antenna array gain through a joint transmission processing on the multi-point signals.

A major problem which occurs in a CoMP system is that the signal propagation delays from/to the mobile station, to/from different cooperating units, such as to and from different base stations, also denoted evolved Node B (eNB), are typically different.

Take an Evolved UMTS Terrestrial Radio Access Network (E-UTRAN) system as a an example. If there is a serving base station and a mobile terminal then they can both obtain information about the propagation delay between them through timing advance and measurement reporting procedures. A first serving base station can in this way obtain the propagation delay between itself and the mobile station, and when the mobile station is handed over to another cell covered by a second base station, this new serving base station can obtain the propagation delay between itself and the mobile station. During this procedure, the mobile station can thus obtain information about the propagation delays in relation to both base stations. However, the first and second base station can not obtain each other's propagation delay to the mobile station. This may limit some usages of a CoMP system.

As mentioned above propagation delay can be obtained through using timing advance. Two network-initialized synchronization methods via explicit TA command signal transmission are proposed in Texas Instruments, 3GPP R1-093168, "Timing Advanced commands in support of UL COMP operation", Aug. 24-28, 2009, 3GPP TSG-RAN WG1#58, Shenzhen, China and Texas Instruments, 3GPP R1-091293, "Enabling Coordinated Multi-point Reception", Mar. 23-27, 2009, 3GPP TSG RAN WG1 #56bis, Seoul, Korea. The first document describes using a primary cooperating unit to collect all the propagation delays between a mobile station and all the cooperating units (base stations) and then deliver a TA command to the mobile station. The second document describes how the above mentioned responsibilities of the primary cooperating unit are taken by a central location. These network synchronization methods can help the serving base station to know the propagation delay not only between itself and any mobile station but also between the non-serving base stations or other coordinated base stations and the mobile station. However, these methods use frequent S1/X2 communications, and more importantly, the propagation delay values obtained may not be precise enough. The granularity of a TA command is for example 12 Ts in E-UTRAN system, see 3GPP TS36.211, "Evolved Universal Terrestrial Radio Access (E-UTRA); Physical channels and modulation. This restricts the use of such TA commands to a loose synchronization system. It can therefore not be used in a tight synchronization system.

There is therefore a need for an improvement on this situation in this field of technology.

SUMMARY

The invention is therefore directed towards providing a time delay difference obtaining scheme that can be used for tight synchronisation in small timing windows.

One object of the invention is therefore to provide a time delay difference obtaining scheme that can be used for tight synchronisation in small timing windows.

This object is according to a first aspect of the invention achieved through a method for determining data allowing a set of base stations to time their transmissions to a mobile station within a timing range. In this method the time delays of transmissions from the set of base stations in reaching the mobile station are obtained in the mobile station and there differences between a group of the time delays and a reference time delay is determined. The time delay differences are then transmitted from the mobile station to base stations in the set that have transmissions with time delays in the group.

These transmissions are furthermore made via at least one link that is specific to the mobile station. In this way the timing of transmissions by the base stations are allowed to be corrected.

The appearance of the first line may be dependent on the distance between the reference position and the first position through using different colours and/or intensities as well as types of lines. The appearance may also be dependent on the distance between the reference position and the first position through various influences on the shape of the line, such as various thicknesses, various distances between dots of the line if the line is dotted, spatial meander frequency if the line is meandering or through the curvature of the line in case it is curved.

The object is according to a second aspect of the invention achieved through a mobile station for determining data allowing a set of base stations to time their transmissions to the mobile station within a timing range. This mobile station comprises at least one radio communication unit for communicating with the set of base stations and a control unit. The control unit is configured or arranged to obtain the time delays of transmissions from the set of base stations in reaching the mobile station, determine a difference between a group of the time delays and a reference time delay, and control the radio communication unit to transmit the time delay differences to base stations in the set that have transmissions with time delays in the group. These transmissions are furthermore made via at least one link that is specific to the mobile station. In this way the timing of transmissions by the base stations are allowed to be corrected.

The control unit may here be provided with a time delay determining module configured to obtain the time delays, a time delay difference determining module configured to determine the time delay differences and an adjustment factor determining module configured to determine the adjustment factor.

This object is according to a third aspect of the invention also achieved by a computer program comprising computer program code for determining data allowing a set of base stations including a reference base station and secondary base stations to time their transmissions to a mobile station within a timing range and comprising computer program code which when run in the mobile station, causes the mobile station to: obtain the time delays of transmissions from the set of base stations in reaching the mobile station, determine a difference between a group of the time delays and a reference time delay, and control the mobile station to transmit the time delay differences to base stations in the set having transmissions with time delays in the group. These transmissions are furthermore made via at least one link that is specific to the mobile station. In this way the timing of transmissions by the base stations are allowed to be corrected.

The invention according to the first, second and third aspects has many advantages. It satisfies both loose and tight synchronization transmission for a multi-point transmission system, where very precise multi-point time shift estimation is possible. The time delay difference determinations are also being initialized by the mobile station. This is advantageous since this entity is the entity that is able to obtain all the time difference from the base stations. The invention can utilize Layer-1 transmission and baseband processing and can therefore be very fast.

The set of base stations may include a primary base station and secondary base stations, where the reference time delay is associated with the primary base station transmission and the group of time delays comprises time delays of the secondary base station transmissions.

The link or links may with advantage comprise a signaling channel. The link or links may furthermore comprise a reference signal that is transmitted by the mobile station. This has the advantage of being easily compatible with E-UTRAN, since it is possible to reuse reference signal generation in an E-UTRAN system merely by adding an extra cyclic shift to the reference signal.

According to one variation of the invention the method then comprises the steps of determining an adjustment factor corresponding to each determined time delay difference and applying the adjustment factor on the reference signal intended for each base station having a transmission with a time delay in said group.

According to this variation of the invention the control unit of the mobile station, and with advantage the adjustment factor determining module of this unit, may then be configured to determine an adjustment factor corresponding to each determined time delay difference and order the radio communication unit to apply the adjustment factor on the reference signal intended for each base station having a transmission with a time delay in said group.

According to this variation of the invention the computer program code furthermore causes the mobile station to determine an adjustment factor corresponding to each determined time delay difference and apply the adjustment factor on the reference signal intended for each base station having a transmission with a time delay in said group.

According to another variation of the invention the method comprises the further step of alternately transmitting a reference signal for at least one base station having a transmission with a time delay in the group with and without adjustment factor.

According to this variation of the invention the control unit of the mobile station, and with advantage the adjustment factor determining module of this unit, may then be configured to order the radio communication unit to alternately transmit a reference signal for at least one base station having a transmission with a time delay in said group with and without adjustment factor.

According to this variation of the invention the computer program code furthermore causes the mobile station to alternately transmit a reference signal for at least one base station having a transmission with a time delay in said group with and without adjustment factor.

The adjustment factor may include a time adjustment factor that shifts the timing of the transmission of the reference signal to a base station having a transmission with a time delay in the group with the corresponding time adjustment factor.

The reference signal may furthermore include a constant amplitude zero autocorrelation sequence, for instance a Zadoff-Chu sequence, and the adjustment factor comprise an angular adjustment factor corresponding to the determined time delay difference.

According to another variation of the invention the step of applying the adjustment factor may then comprise shifting the reference signal for at least one base station having a transmission with a time delay in the group with an angle comprising the corresponding angular adjustment factor.

According to this variation of the invention the control unit of the mobile station, and with advantage the adjustment factor determining module of this unit, may then be configured to order the radio communication unit to shift the reference signal for at least one base station having a transmission with a time delay in the group with an angle comprising the corresponding angular adjustment factor.

According to this variation of the invention the computer program code furthermore causes the mobile station to shift the reference signal for at least one base station having a transmission with a time delay in the group with an angle comprising the corresponding angular adjustment factor.

Another object of the invention is to provide a synchronisation scheme that is based on a time delay difference obtaining scheme that can provide small time delay difference values.

This object is according to a fourth aspect of the invention achieved through a method for controlling the timing of the transmissions to a mobile station from a base station. In the method the difference between the time delay of the transmissions of the base station to the mobile station and a reference time delay is received in a device for controlling such timing from the mobile station via at least one link. This link is specific to the mobile station. In the device the time delay difference is compared with a time range within which the base station is to time its transmissions to the mobile station and the timing of the base station transmissions to the mobile station correcting by the device if the difference is outside of the time range.

The object is according to a fifth aspect of the invention also achieved through a device for controlling the timing of the transmissions to a mobile station from a base station. The device comprises a control unit that is configured to receive, from the mobile station via at least one link that is specific to the mobile station, the difference between the time delay of the transmissions of the base station to the mobile station from a reference time delay, compare the time delay difference with a time range within which the base station is to time its transmissions to the mobile station, and correct the timing of the base station transmissions to the mobile station if the difference is outside of the time range.

The device may with advantage be a base station. This base station may include a radio communication unit and the control unit may include a timing range comparing module configured to perform the above-mentioned comparison.

This object is according to a sixth aspect of the invention achieved through a computer program product for controlling the timing of the transmissions to a mobile station from a base station and comprising computer program code which when run on a device for controlling such timing, causes said device to receive, from the mobile station via at least one link that is specific to the mobile station, the difference between the time delay of the transmissions of the base station to the mobile station and a reference time delay, compare the time delay difference with a time range within which the base station is to time its transmissions to the mobile station and correct the timing of the base station transmissions to the mobile station if the difference is outside of the time range.

The invention according to the fourth, fifth and sixth aspects has many advantages. It satisfies both loose and tight synchronization transmission for a multi-point transmission system, where very precise multi-point time shift estimation is possible. The time delay difference determinations are also being initialized by the mobile station. This is advantageous since this entity is the entity that is able to obtain all the time difference from the base stations. The invention can utilize Layer-1 transmission and baseband processing and can therefore be very fast.

The link or links may comprise a signaling channel and may additionally comprise a reference signal transmitted by the mobile station.

According to one variation of the invention the method then comprises the further steps of estimating an adjustment factor that has been applied on the reference signal and determining the time delay difference based on the estimated adjustment factor.

According to this variation of the invention the control unit of the device may then be configured to estimate an adjustment factor that has been applied on the reference signal and determine the time delay difference based on the estimated adjustment factor. The control unit may for this reason be equipped with an adjustment factor estimating module configured to perform the estimation and determination.

According to this variation of the invention the computer program code furthermore causes the device to estimate an adjustment factor that has been applied on the reference signal and determine the time delay difference based on the estimated adjustment factor.

The reference signal may be alternately transmitted by the mobile station with and without adjustment factor and therefore the estimation of the adjustment factor may comprise investigating the difference between the reference signal with and without adjustment factor applied.

The adjustment factor may also include a time adjustment factor corresponding to the timing difference. This factor may then shift the timing of the transmission of the reference signal with the time adjustment factor. In this case the estimation comprises estimating the time adjustment factor through investigating the shifting of the timing.

The reference signal may finally include a constant amplitude zero autocorrelation sequence, for instance a Zadoff-Chu sequence, that has been shifted with an angle comprising an angular adjustment factor corresponding to the determined time delay difference. In this case the step of estimation of the adjustment factor may comprise estimation of the angular adjustment factor through investigating the angle of the shift.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention is generally directed towards determining the transmission time delay between a mobile station and a group of base stations together with a correcting of the timing in order to limit the differences between different base stations to within a certain timing window.

The general idea of the present invention is to let the base stations in a set of cooperating base stations to synchronize their transmissions to within a required transmission time window or time range. This is according to the invention done through the mobile station determining differences between the transmissions delays of the set of base stations and returning these transmission delay differences in order for the base stations to synchronize their transmissions. The thus transmitted multi-point delay information can then be used for applications needing either a loose synchronization or a tight synchronization in the multi-point transmission system, e.g. Coordinated Multi-Point (CoMP) or Relay.

The invention will now be described in more detail in the context of a wireless communication network N that may be a WAN (Wide Area Network). This network may here be a cellular network such as a Long Term Evolution (LTE) network or an Universal Mobile Telecommunications System (UMTS) network with without connection to an IMS (Internet Protocol Multimedia Subsystem). It should however be realized that the present invention is not limited to LTE or UMTS, but may be provided in any cellular network or in any wireless wide area network.

Figure 1:
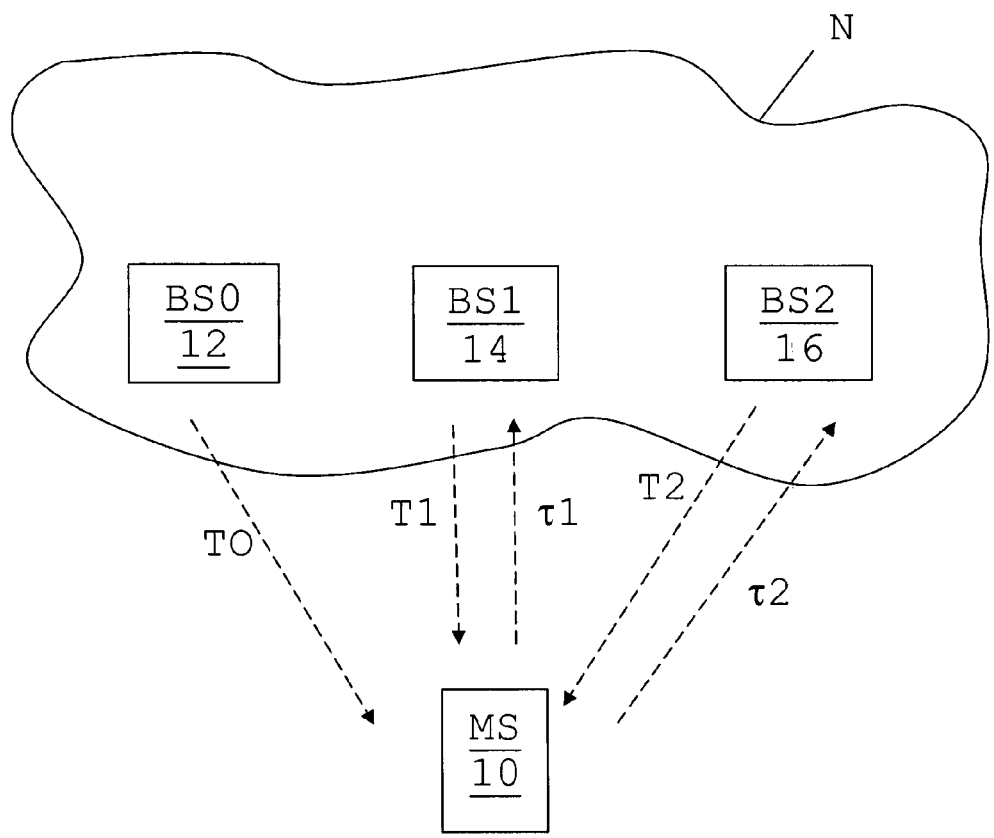
FIG. 1 schematically shows an access network of a wireless wide area network including a number of base stations that are communicating with a mobile station.

In FIG. 1 an access network N of such a wireless wide area network is shown. The figure is limited to an access network in order to focus this description to the essential parts of the invention. The access network N may here for instance be an Evolved UMTS Terrestrial Radio Access Network (E-UTRAN), but will of course be of another type if the wireless wide area network is not an LTE network. To the access network N there is connected a first mobile station 10, which in the present example is a cellular phone. A mobile station is in these types of systems also often referred to as a User Equipment (UE). A cellular phone is merely one example of a mobile station with which the invention may be used. Other types of mobile stations are computers, like a PC (Personal Computer) and laptop and/or palmtop computers, and electric organizers.

The mobile station 10 communicates with a set of cooperating base stations, which set here as an example includes a primary base station BS0 12 and a first and a second secondary base station BS1 14 and BS2 16. Such a base station is in LTE often referred to as evolved Node B (eNB). More particularly the mobile station 10 receives transmissions T0 from the primary base station 12 and transmission T1 and T2 from the first and second secondary base stations 14 and 16, respectively. The mobile station 10 also sends time delay difference values τ1 and τ2 to the first and second secondary base stations 14 and 16, respectively. This will be described in more detail shortly.

Figure 2:
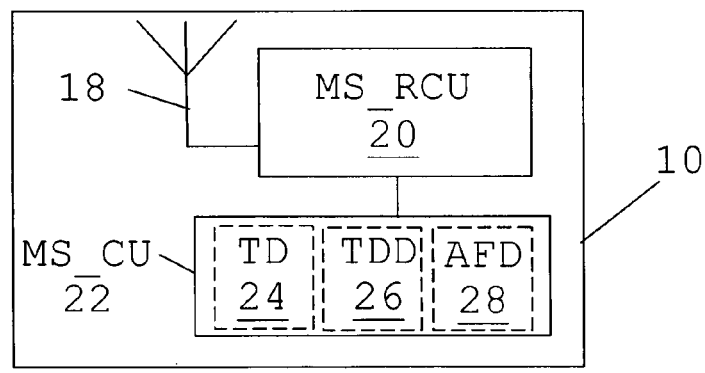
FIG. 2 shows a simplified block schematic of the mobile station.

FIG. 2 schematically shows a block schematic of the mobile station 10 according to one variation of the invention. The mobile station 10 includes a communication interface for communicating with the network N. The communication interface is here provided in the form of an antenna 18 and a radio communication unit 20, which radio communication unit 20 is thus a mobile station radio communication unit (MS_RCU). It should here be realized that it is possible with more radio communication units in this interface. To this radio communication unit 20 there is connected a control unit 22, which control unit 22 thus is a mobile station control unit (MS_CU). The control unit here includes a time delay determining module TD 24, a time delay difference determining module TDD 26 and an adjustment factor determining module AFD 28. The antenna 18 is here provided in the interior of the mobile station 10, i.e. within its casing. It should however be realized that it may be provided outside of it, i.e. outside the casing.

These are all the units shown in FIG. 2. It should here be realized that a mobile station may comprise several more units and functions, such as a user input unit, like a keyboard or keypad and a data presenting unit like a display or a speaker and various function units, such as media players, camera and positioning unit like a GPS positioning unit. However, these have all been omitted in order to provide a clearer description of the present invention.

Figure 3:
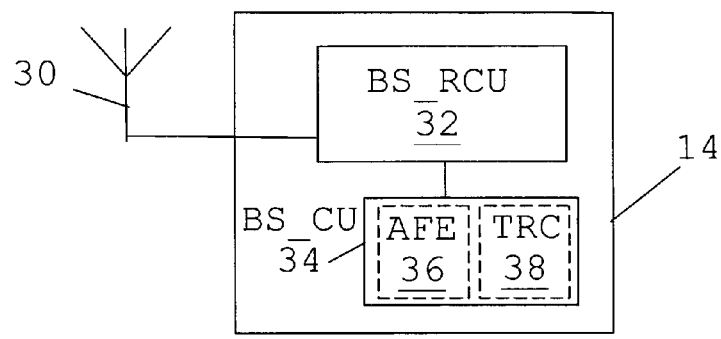
FIG. 3 shows a simplified block schematic of one of the base stations.

FIG. 3 shows a block schematic of a simplified version of the first secondary base station 14. This base station 14 also includes a communication interface in the form of an antenna 30 connected to a radio communication unit 32, which is thus a base station radio communication unit (BS_RCU). To this radio communication unit 32 there is connected a control unit 34, which control unit is thus a base station control unit (BS_CU). The control unit 34 here includes an adjustment factor estimating module AFE 36 and a timing range comparing module TRC 38. The antenna 30 is here provided outside of the casing of the base station.

It should also here be realized that the first secondary base station 12 may include several more units and functions, which have been omitted here in order to provide a clearer description of the present invention. It may for instance include more antennas. The functionality provided in the second base station may furthermore be provided in each of the other base stations of the set.

Figure 4:
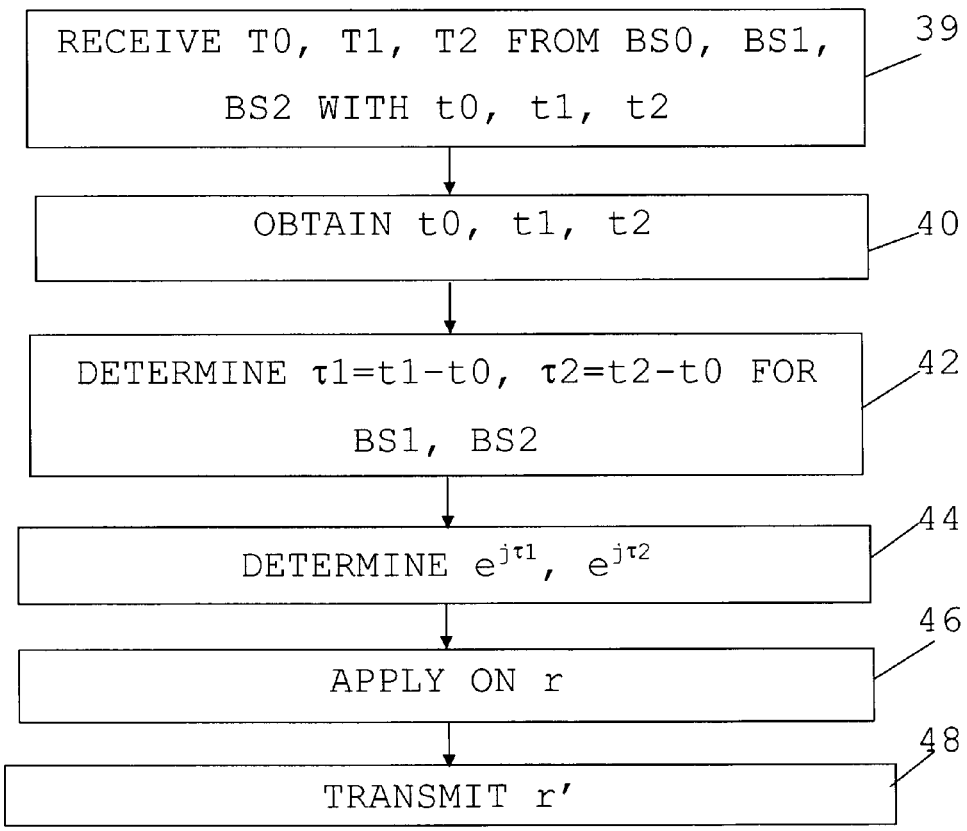
FIG. 4 shows a flow chart of a number of method steps being performed in a method for determining data allowing a set of base stations to time their transmissions according to a first embodiment of the invention.
Figure 5:
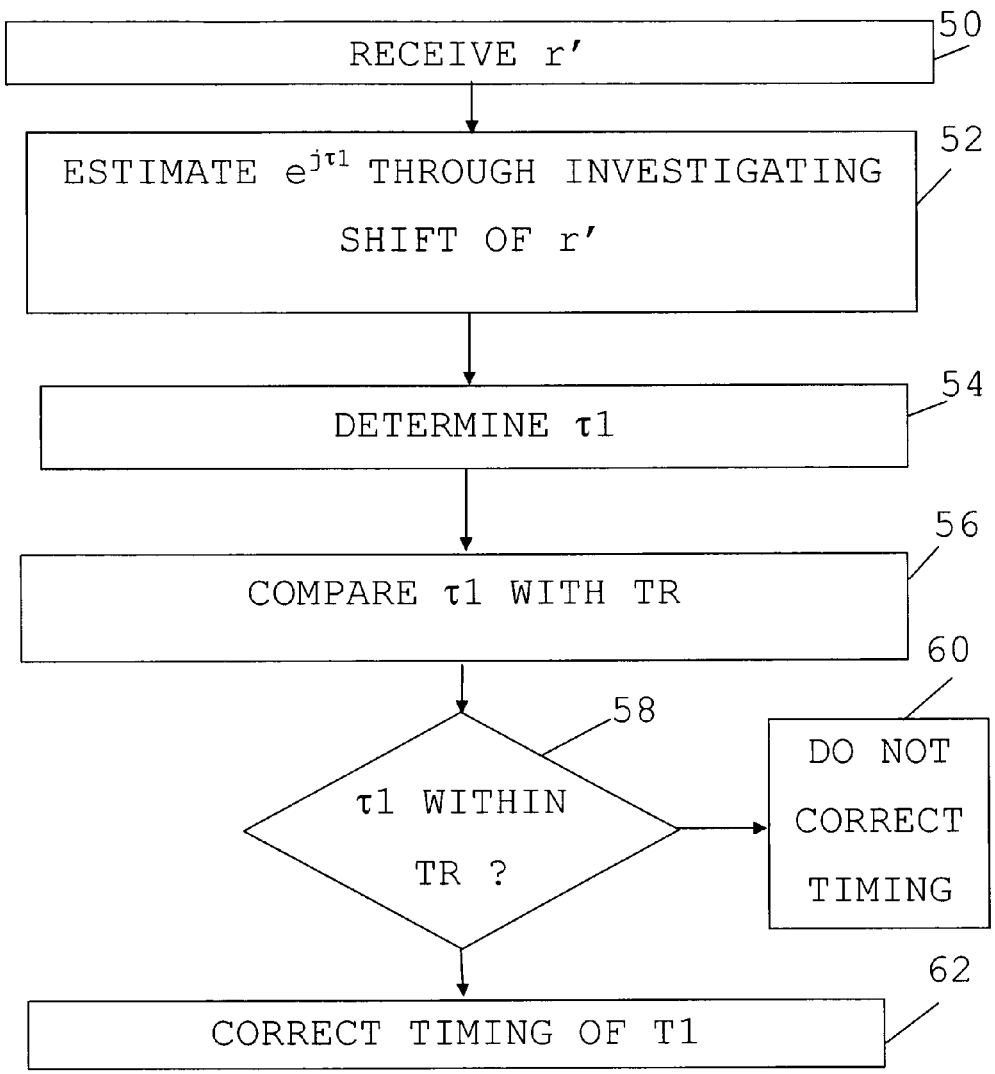
FIG. 5 shows a flow chart of a number of method steps being performed in a method for controlling the timing of the transmissions of a base station to a mobile station also according to the first embodiment of the invention, and FIG. 6 schematically shows a computer program product according to an embodiment of the invention in the form of a CD ROM disc on which a computer program realizing the methods of the invention is stored.
Figure 6:
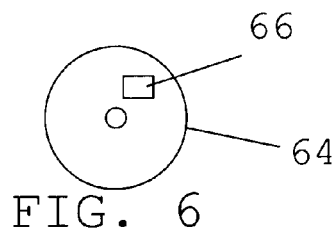

Now the functioning of the invention according to the first embodiment of the invention will be described in more detail with reference being made to the previously described FIGS. 1-3 as well as to FIG. 4, which shows a flow chart of a number of method steps being performed in a method for determining data allowing a set of base stations to time their transmissions, and to FIG. 5, which shows a flow chart of a number of method steps being performed in a method for controlling the timing of the transmissions of a base station in a set of base stations. The method steps of FIG. 5 are performed in the mobile station 10, while the method steps of FIG. 6 are performed in the first secondary base station 14.

The mobile station 10 is in contact with and communicating with a set of base stations, that here includes the primary base station 12 and the first and second secondary base stations, 14 and 16. Here the set of base stations cooperate in the communication with the mobile station. One of these base stations has been selected to act as a primary base station that is a reference base station. This selection can be made either in the mobile station or in the network, for instance in one of the base stations in the set or in a node at a higher level. When the selection is made in the network the mobile station is informed of the selection. This can be done via a signaling channel such as the Physical Downlink Control Channel (PDCCH) or the Physical Downlink Shared Cannel (PDSCH) or through Radio Resource Control (RRC) signaling. It is here possible to make a random selection. However, it is also possible that the selection is made based on link quality such as signal strength or bit error rate. It may also be based on the load of the base stations. It may also be the base station having the best or a medium time delay for the mobile station. The set described here includes three base stations. This number is only exemplifying. It should thus be realized that the set may include fewer base stations, like two, or more base stations, like for instance four or five base stations.

The communications between the mobile station and the set of base stations is furthermore synchronised and performed according to CoMP. If the mobile terminal is to engage in some activity requiring coordination of base station transmissions, then a tight synchronisation or a loose or relaxed synchronisation may be selected based on the type of coordination. If for instance the mobile station is to be involved in coordinated scheduling, then a loose synchronisation may be sufficient. However if the mobile station is to be involved in joint processing, then a tight synchronisation may be selected. Selection can also here be made in the mobile station as well as in the network, such as in one of the base stations or on a higher level. From this it can also be seen that a point-to-multipoint connection can be considered to exist between the mobile station and the set of base stations.

In the communication between the set of base stations and the mobile station 10, the mobile station 10 furthermore receives transmissions from the set of base stations, step 39. It thus receives transmissions T0 from the primary base station 12, transmissions T1 from the first secondary base station 12 and transmissions T2 from the second secondary base station 14. As the communication is via air, there is a delay through this medium, a propagation delay. Furthermore, as the distances between the mobile station and the base stations vary, these propagation delays will differ. Thus the mobile station 10 receives the transmissions T0 from the primary base station 12 with a transmission delay t0, the transmissions T1 from the first secondary base station 14 with a transmission delay t1 and the transmissions T2 from the second secondary base station 16 with a transmission delay t2.

Time delay data, in the form of timing advance data may be provided as a part of these transmissions.

These transmissions are received in the mobile station 10 by the radio communication unit via the antenna and handled there in known fashion. However, if there is time delay data, such as timing advance data and Random Access Channel (RACH) processing data, this data is forwarded to the time delay determining module 24 of the mobile station control unit 22. In this module the actual time delays t0, t1, t2 of each transmission T0, T1, T2 are determined based on this data, step 40. The time delay t0 of the transmissions of the primary or reference base station 12 is here a reference time delay.

As mentioned above, this may be done based on timing advance data. A base station communicating with a mobile station may determine the delay from the mobile station through investigating the difference in reception of signals from the mobile station and when in a signal reception structure these signals are to be received. This difference corresponds to the delay of the mobile station transmissions. However, the base station will have the same delay in its transmissions to the mobile station. The base station then sends out timing advance commands ordering the mobile station to change its transmissions to fit in the signal reception structure. The commands thus specify a changed timing. This changed timing is then also indicative of the transmission delay of the base station. In this way it is then possible for the mobile station to obtain the transmission delays of all the base stations in the set.

As the delays t0, t1 and t2 of the transmissions T0, T1 and T2 have been obtained or determined by the time delay determining module 24, the time delay difference determining module 26 of the control unit 22 then determines differences between a group of time delays and a reference time delay. In this first embodiment the group of time delays consists of the time delays of the transmissions from the secondary base stations 14 and 16, while the reference time delay is associated with the transmissions of the primary base station 12. However, it is as an alternative possible also that the time delay of the primary base station is included in the group. In this first embodiment, the module thus determines the time delay differences between the time delays t1, t2 of the transmissions T1, T2 from the secondary base stations 14 and 16 and the reference time delay t0 of the transmission T0 of the primary reference base station 12, step 42. It thus determines a first time delay difference τ1=t1−t0 for the first secondary base station 14 to the primary reference base station 12 and a second time delay difference τ2=t2−t0 for the second secondary base stations 16 to the primary base station 12.

Data specifying the determined time delay differences τ1 and τ2 is then to be transmitted to the first and second secondary base stations 14 and 16, respectively. There are a number of ways in which such data may be transmitted. According to the first embodiment of the present invention, the transmission delay data, which is data enabling the second and third base stations to time tight transmissions, is sent being coded onto a reference signal r, which reference signal may be the signal demodulation reference signal (DMRS) or the signal sounding reference signal (SRS). In the first embodiment of the present invention this data is coded on the reference signal using a phase shift in the frequency domain.

In order to do this, the adjustment factor determining module 28 of the mobile station control unit 22 determines one adjustment factor corresponding to each of the determined time delay differences, step 44. This adjustment factor is then to be applied on each reference signal intended for the secondary base stations. In this embodiment it determines adjustment factors that are phase shifts $e^{j\tau 1}$ and $e^{j\tau 2}$. According to this first embodiment of the invention phase shifts are provided to the radio communication unit 20, which applies them on one or more reference signals r, step 46. It thus phase shifts a reference signal with a shift that is a linear phase shift.

A reference signal r can here typically be defined as:

$$r_{u,v}^{(\alpha)}(n)=e^{j\alpha n}\bar{r}_{u,v}(n), 0\leq n<M_{sc}^{RS} \qquad (1)$$

where $\bar{r}_{u,v}(n)$ is a Zadoff-Chu base sequence, $M_{sc}^{RS}$ is the length of the reference signal sequence and $\alpha$ is a specific cyclic shift.

According to the first embodiment of the invention, this Zadoff-Chu reference signal r is here modified according to:

$$r'_{u,v}{}^{(\alpha)}(n)=e^{j\tau_i}e^{j\alpha n}\bar{r}_{u,v}(n), 0\leq n<M_{sc}^{RS} \qquad (2)$$

As can be seen in equation (2), there is thus a phase shift of the reference signal with the transmission delay difference $\tau_i$. This phase shift can thus also be seen as providing an adjusted cyclic shift $\alpha'=\alpha+\tau$.

As can be seen in the first embodiment of the invention, the adjustment factor is an angular adjustment factor corresponding to the determined time delay difference, which adjustment is applied on the reference signal through shifting it with an angle comprising the adjustment factor. The adjusted reference signal is then transmitted to the base stations having transmissions with time delays that are included in the above-mentioned group. In this first embodiment the adjusted reference signal r' is thus transmitted by the radio communication unit 20 to both the secondary base stations 12 and 14, step

48, in order for them to adjust their timing so that their transmissions are synchronized with the transmissions of the primary base station 12. The time delay differences are thus transmitted from the mobile station 10 to the secondary base stations 14 and 16 via at least one link. This link is furthermore specific to the mobile station and also with advantage provided through a signaling channel. In this embodiment of the invention, a first adjusted reference signal is sent to the first secondary base station 14 and a second adjusted reference signal is sent to the second secondary base station 16. These reference signals are in this embodiment furthermore sent to the base stations on the same base sequence but with a different specific cyclic shift α for the base stations. The cyclic shifts are here furthermore orthogonal. The reference signals are furthermore sent to the base stations on an uplink channel that is specific to the mobile station. This uplink channel can for instance be the Physical Uplink Shared Channel (PUSCH), Uplink Control Information (UCI) or a Physical Uplink Control Channel (PUCCH).

It should here be realized that as an alternative the reference signals could have been sent using separate base sequences. In this case it is not necessary to use the cyclic shift α.

As the time delay data is transferred to the secondary base stations each of them may then use this data to synchronize their transmissions with the transmissions of the reference base station. The time delay differences are here investigated by a device for controlling the timing of the transmissions. Such a device may typically be the base station receiving the time delay difference. However, it may also be another device, i.e. it may be another node in the network.

How this may be done will now be described in relation to the first secondary base station 14.

The first secondary base station 14 thus receives the adjusted reference signal r' in the radio communication unit 32 via the antenna 30, step 50. The reference signal r' is then transferred to the adjustment factor estimating module 36 of the base station control unit 34, which goes on and estimates the adjustment factor, step 52. In this embodiment the adjustment factor is estimated through investigating the angular shift of the adjusted reference signal.

This can be done since the angular shift α if present is known and also the base sequence $\bar{r}_{u,v}(n)$ is known. The time delay difference is then determined through investigating the shift of the adjusted reference signal r', step 54. This estimation can here be performed in the frequency domain or after Fourier transformation also in the time domain. In this first embodiment the estimated time delay difference is determined as the difference between the angular shift α' of the received reference signal r' and the known angular shift α. Thereafter the time delay difference is compared with a timing window or time range TR, step 56. Depending on the type of coordination that is required, this time range could corresponds to the time range of a loose synchronisation or the time range of a tight synchronisation and if the timing difference is within this time range TR, step 58, no correction is being made, step 60, while if the time delay difference is outside of the range TR, step 58, the radio circuit 32 is ordered to correct its timing with a correction factor that aligns the transmission with the transmission T0 of the reference base station 12. The aligning here means that they are aligned so that they are received at the mobile terminal essentially at the same time or as limited by the tight synchronization schedule.

In this way it is possible to adjust the timing of the transmissions from the secondary base stations to the mobile station for being synchronised with the transmissions of the primary or reference base station. The synchronized transmission can be done either in frequency domain by a linear phase shift on subcarriers or in the time domain by a fixed time shift to the transmit signals, this can make the signals from the base stations of the set arrive at the mobile station within a loose or tight receiving window in a multi-point transmission system.

It is possible to vary the present invention in a number of ways apart from those already described.

In the description made above the reference time delay was associated with the transmissions of a primary or main base station. However, it is possible that the reference time delay is not obtained directly as the time delay of one of the base stations in the set, but could be set as a value that is a combination of the time delays of at least some of the base stations in the set and perhaps as a combination of the time delays of all base stations in the set. It could for instance have a value in-between the various time delays of the base stations of the set. The reference time delay could for instance be a mean or median value of the delays of the base stations in the set. In this case also the base station acting as primary base station will receive a time delay difference that has been determined for it. It may also receive such a difference also when acting as a reference. However, then the difference will indicate a zero time delay difference. From the foregoing discussion it can thus be seen that the reference time delay may be determined based on the time delays of at least one base station in the set, but can also be determined based on the delays of some or all base stations in the set.

The shift of the reference signal may also be varied. It may for instance as an alternative be a shift in time. This means that the adjustment factor may be a time adjustment factor shifting the time of the transmission of a reference signal to a base station. The reference signal may here be shifted in time with a fixed time shift corresponding to the time delay difference.

A base station will then be able to obtain the time difference based on detecting the time shift of the base sequence associated with itself from the time of an non-shifted base sequence or from the time of a cyclically α-shifted base sequence.

In order to improve the ability of a base station to detect the time delay difference it is furthermore possible that the mobile station alternates with sending of a modified reference signal r' and non-modified reference signal r, i.e. alternating sending of the reference signal with time delay data coded into it and without time delay data coded into it. This may be done with both time shifted and phase shifted reference signals.

In this way it is easier for the base station to determine the time delay difference, since it is possible to compare the reference signal having the time delay coding with the reference signal lacking the coding.

It is also possible to make this transmission of coded and non-coded reference signals be performed on separate uplink channels. A coded reference signal can then for instance be sent in a DMRS channel, while a non-coded reference signal be sent in an SRS channel. In this way it is possible for each base station to obtain both the absolute transmission delay $t_i$ as well as the corresponding time delay difference $\tau_i$.

It is furthermore possible to send the time difference data to the base stations explicitly on a signaling channel, i.e. as data transmitted on a common signaling channel such as PUCCH, UCI or PUCCH. This can also be combined with sending time difference data coded into a reference signal.

A Zadoff-Chu sequence is an example of one type of Constant Amplitude Zero AutoCorrelation (CAZAC) sequence that can be used in relation to the present invention. It should however be realized that it is possible to other types of such sequences.

It should furthermore be realized that what has been described above in relation to one mobile station may be applied for a group of mobile stations.

The invention has a number of advantages. It satisfies both loose and tight synchronization transmission for a multi-point transmission system, where especially the time delay difference transmission using coding of a reference signal can provide very precise multi-point time shift estimation. Reference signal aided multipoint timing difference transmission is also easily compatible with E-UTRAN, since it is possible to reuse reference signal generation in an E-UTRAN system merely by adding an extra cyclic shift to the reference signal. The time delay difference determinations are also being initialized by the mobile station. This is advantageous since this entity is the entity that is able to obtain all the time difference information by for instance using a TA procedure. The invention can utilize Layer-1 transmission and baseband processing instead of S1/X2 communication, and is therefore very fast.

The control units and their modules may each with advantage be provided in the form of a processor with associated program memory including computer program code for performing the functionality of the modules. It should be realized that such a unit may also be provided in the form of hardware, like for instance in the form of an ASIC circuit. The unit as well as its modules may also be provided in the form of a combination of one or more logic circuit. The same is furthermore true also for the radio communication units. For this reason the invention may also be provided as software. This means that the invention may be provided as computer program code which when run in a mobile station or a base station, causes the mobile station or base station to perform the functionality of a corresponding control unit. This program code could furthermore be provided on a data carrier, like a CD ROM disc or a memory stick, which will implement the functionality of the invention when being loaded into a base station or a mobile station. One such computer program product in the form of a CD ROM disc 64 on which such computer program code 66 is stored is schematically shown in FIG. 6.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method for determining data enabling a plurality of base stations to time their transmissions to a mobile station within a timing range, the method comprising the steps of:
   obtaining, in the mobile station, time delays of transmissions from each of the plurality of base stations in reaching the mobile station, wherein the plurality of base stations includes a primary base station and one or more secondary base stations;
   determining, in the mobile station, time delay differences between the time delays and a reference time delay, wherein the reference time delay is associated with the primary base station transmission and the time delays comprise time delays of the secondary base station transmissions;
   transmitting the time delay differences from the mobile station to the plurality of base stations via at least one link that is specific to the mobile station in order to enable the timing of transmissions by the base stations to be corrected, wherein the mobile station transmits the time delay differences using a reference signal, and wherein the step of transmitting the time delay differences further comprises the steps of:
   determining an adjustment factor corresponding to each determined time delay difference, and
   applying the adjustment factor on the reference signal intended for each of the secondary base stations,
   wherein the reference signal includes a constant amplitude zero autocorrelation sequence, the adjustment factor comprises an angular adjustment factor corresponding to the determined time delay difference, and the step of applying the adjustment factor comprises shifting the reference signal for at least one secondary base station with an angle comprising the corresponding angular adjustment factor.

2. The method according to claim 1, wherein said at least one link comprises a signaling channel.

3. The method according to claim 1, further comprising the step of alternately transmitting the reference signal for at least one secondary base station with and without the adjustment factor.

4. The method according to claim 1, wherein the constant amplitude zero autocorrelation sequence is a Zadoff-Chu sequence.

5. A mobile station for determining data allowing a plurality of base stations to time their transmissions to the mobile station within a timing range, the mobile station comprising:
   at least one radio communication unit for communicating with the plurality of base stations; and
   a control unit configured to:
   obtain time delays of transmissions from each of the plurality of base stations in reaching the mobile station, wherein the plurality of base stations includes a primary base station and one or more secondary base stations;
   determine time delay differences between the time delays and a reference time delay, wherein the reference time delay is associated with the primary base station transmission and the time delays comprise time delays of the secondary base station transmissions; and
   control the radio communication unit to transmit the time delay differences from the mobile station to the plurality of base stations via at least one link that is specific to the mobile station in order to enable the timing of transmissions by the base stations to be corrected, wherein the radio communication unit transmits the time delay differences using a reference signal, and wherein the control unit is further configured to control the radio communication unit to perform the following as part of transmitting the time delay differences:
   determine an adjustment factor corresponding to each determined time delay difference, and
   apply the adjustment factor on the reference signal intended for each of the secondary base stations,
   wherein the reference signal includes a constant amplitude zero autocorrelation sequence, the adjustment factor comprises an angular adjustment factor corresponding to the determined time delay difference, and the radio communication unit applies the adjustment factor by shifting the reference signal for at least one secondary base station with an angle comprising the corresponding angular adjustment factor.

6. The mobile station according to claim 5, wherein the constant amplitude zero autocorrelation sequence is a Zadoff-Chu sequence.

7. A method for controlling timing of transmissions to a mobile station from a base station, the method comprising the steps of:
- receiving, in a device for controlling the timing and from the mobile station via at least one link that is specific to the mobile station, a difference between a time delay of the transmissions of the base station to the mobile station and a reference time delay;
- comparing, in said device, the time delay difference with a time range within which the base station is to time its transmissions to the mobile station; and
- correcting, by said device, the timing of the base station transmissions to the mobile station if the difference is outside of the time range.

8. The method according to claim 7, wherein said at least one link comprises a signalling channel.

9. The method according to claim 7, wherein the base station receives a reference signal transmitted by the mobile station, and the method further comprises the steps of:
- estimating an adjustment factor that has been applied on the reference signal; and
- determining the time delay difference based on the estimated adjustment factor.

10. The method according to claim 9, wherein the reference signal is alternately transmitted by the mobile station with and without the adjustment factor, and the step of estimating the adjustment factor comprises investigating the difference between the reference signal with and without the adjustment factor applied.

11. The method according to claim 9, wherein the adjustment factor includes a time adjustment factor corresponding to the timing difference and that shifts the timing of the transmission of the reference signal with the time adjustment factor, and the step of estimating comprises estimating the time adjustment factor through investigating the shifting of the timing.

12. The method according to claim 9, wherein the reference signal includes a constant amplitude zero autocorrelation sequence that has been shifted with an angle comprising an angular adjustment factor corresponding to the determined time delay difference, and the step of estimating the adjustment factor comprises estimating the angular adjustment factor through investigating the angle of the shift.

13. The method according to claim 12, wherein the constant amplitude zero autocorrelation sequence is a Zadoff-Chu sequence.

14. A device for controlling timing of transmissions to a mobile station from a base station, the device comprising:
- a control unit configured to:
    - receive, from the mobile station via at least one link that is specific to the mobile station, a difference between a time delay of the transmissions of the base station to the mobile station and a reference time delay;
    - compare the time delay difference with a time range within which the base station is to time its transmissions to the mobile station; and
    - correct the timing of the base station transmissions to the mobile station if the difference is outside of the time range.

15. The device according to claim 14, wherein the device is implemented in the base station.

16. The device according to claim 14, wherein the device receives a reference signal transmitted by the mobile station, and the control unit is configured to estimate an adjustment factor that has been applied on the reference signal, and to determine the time delay difference based on the estimated adjustment factor.

\* \* \* \* \*